No. 812,882. PATENTED FEB. 20, 1906.
ST. ELMO ROBINSON.
ANIMAL SHEARS.
APPLICATION FILED AUG. 25, 1904.
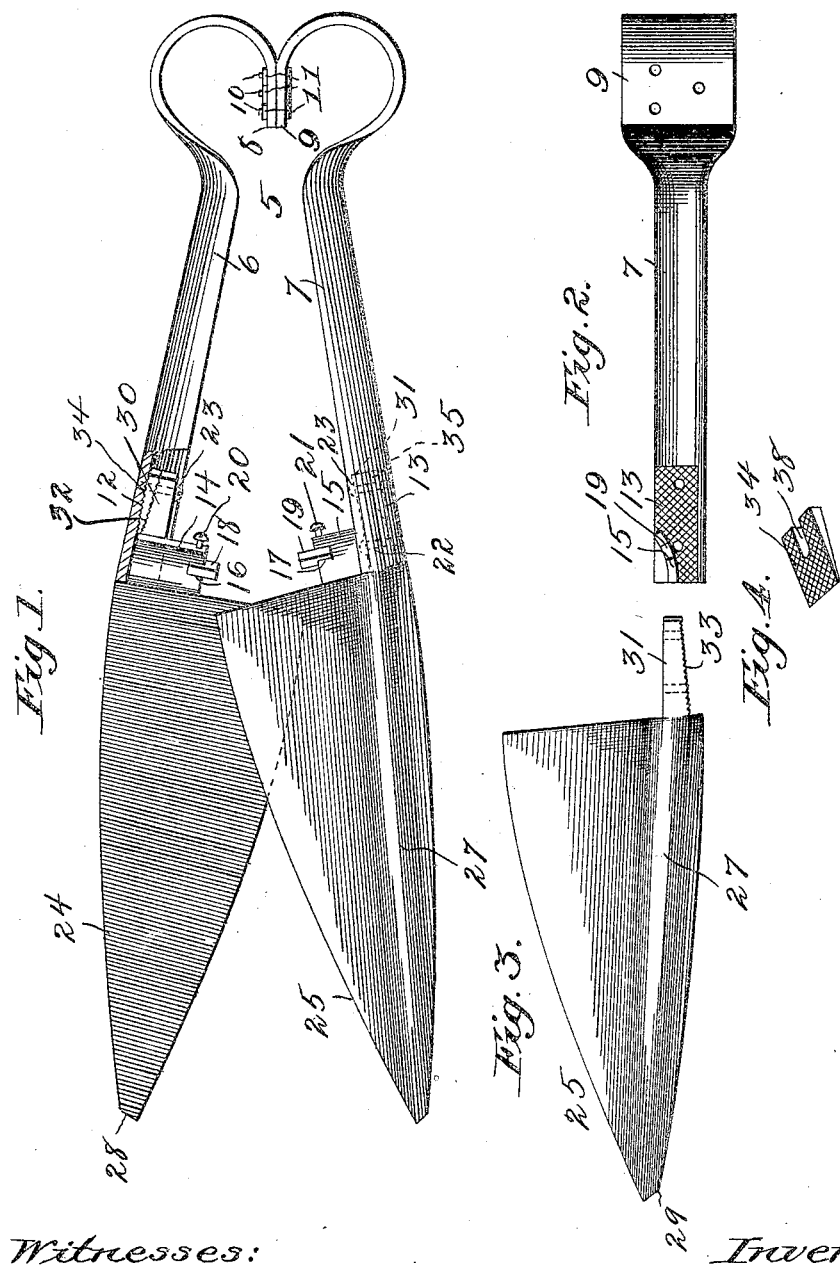
Witnesses:
A R Collins
G. W. Parman.
Inventor:
St. Elmo Robinson.
by Herrick & Herrick
Attys.

UNITED STATES PATENT OFFICE.

ST. ELMO ROBINSON, OF ARLINGTON, OREGON.

ANIMAL-SHEARS.

No. 812,882.  Specification of Letters Patent.  Patented Feb. 20, 1906.

Application filed August 25, 1904. Serial No. 222,178.

*To all whom it may concern:*

Be it known that I, ST. ELMO ROBINSON, a citizen of the United States, residing at Arlington, in the county of Gilliam, State of Oregon, have invented a new and useful Sheep-Shears, of which the following is a specification.

My invention relates to sheep-shears, and has for its object the provision of a device of this character comprising a spring-handle and blades removably and adjustably secured to said handle, whereby said blades may be adjusted at varying angles with relation to the handle or may be entirely removed therefrom when worn out and other blades substituted therefor.

A further object of the invention is the provision of buffers for limiting the movement of the blades and for receiving the impact incident to their movement.

Further objects and advantages of the invention will be set forth in the detailed description which now follows.

In the accompanying drawings, Figure 1 is a side elevation of a sheep-shear constructed in accordance with my invention with a portion of the spring-handle thereof broken away to illustrate an adjusting means hereinafter described. Fig. 2 is an inner face elevation of one side of said spring-handle. Fig. 3 is a side elevation of one of the blades, and Fig. 4 is a detail perspective view of an adjusting-wedge.

Like numerals designate similar parts in all of the figures of the drawings.

Referring to the drawings, the numeral 5 designates a spring-handle comprising the members 6 and 7, the outer ends of which terminate in the flanges 8 and 9, adapted to lie in contact with each other and to be firmly secured together by bolts and nuts 10 and 11. The outer surfaces of the members 6 and 7 are convex, and consequently provide a firm and comfortable grip for the operator. These members are provided near their inner ends with knurled surfaces 12 and 13. Buffer-supporting lugs 14 and 15, recessed, as at 16 and 17, for the reception of elastic buffers 18 and 19, are diagonally disposed with relation to the members 6 and 7 and are provided with set-screws 20 and 21 for retaining said buffers in position.

Adjustably secured to the members 6 and 7 by screws 22 and 23 are the blades 24 and 25. These blades are provided with strengthening-ribs 27, which serve to impart rigidity to said blades and to prevent them from bending. The points of the blades are so ground at 28 and 29 as to present a diamond-shaped point, whereby said blades are prevented from sticking into the animal when the shears are used. The ribs 27 lie upon the outer faces of the blades, the inner faces of said blades presenting a plane surface and lying in contact with each other. The blades are provided at the heel with extensions 30 and 31, having knurled faces 32 and 33. Adjusting-wedges 34 and 35, having knurled faces, lie when the parts are assembled between the knurled faces 32 and 33 of the extensions 30 and 31 and the knurled portions 12 and 13 of members 6 and 7. Said wedges are slotted, as at 38, to permit said wedges to be moved longitudinally without striking the screws 23.

By virtue of the construction set forth the blades may be adjusted with relation to the spring-handle to give the desired "rear." In other words, their points may be brought closer together or thrown farther apart by adjusting the wedges to the desired position and then tightening the screws 23.

From the foregoing description it will be seen that a simple and efficient construction is herein provided for rendering the blades of a sheep-shear adjustable and detachable. Important results are thereby attained. The spring-handle is the most expensive part of a sheep-shear, and it is desirable to have said shears so arranged that the blades may be replaced when worn out without discarding said spring-handle.

A further advantage of being able to replace the worn-out blades with new ones is that the operator is not required to break in a new pair of shears when the old blades are worn out. It requires several days to get the springs fitted or shaped to the hand of the operator. A new pair of springs is considered very hard on the hand and often causes the hands of the operator to become sore.

It is to be understood that while the elements herein shown and described are well adapted to serve the purposes set forth I do not desire to limit myself to the exact construction shown and described, for minor changes within the scope of the appended claim may be made without departure from the invention.

Having described my invention, what I claim is—

In a device of the character described, the combination with a spring-handle, of blades having extensions which lie in said handle, slotted adjusting-wedges lying between the handle and said extensions of the blades, and fastening devices passing through said extensions and the handle and through the slotted portions of the wedges.

In testimony whereof I have hereunto signed my name to this specification in the presence of two witnesses.

ST. ELMO ROBINSON.

Witnesses:
L. E. BENNETT,
J. E. BURDETT.